July 14, 1925.  1,546,066
J. B. GAGNE
TRAP
Filed June 16, 1924
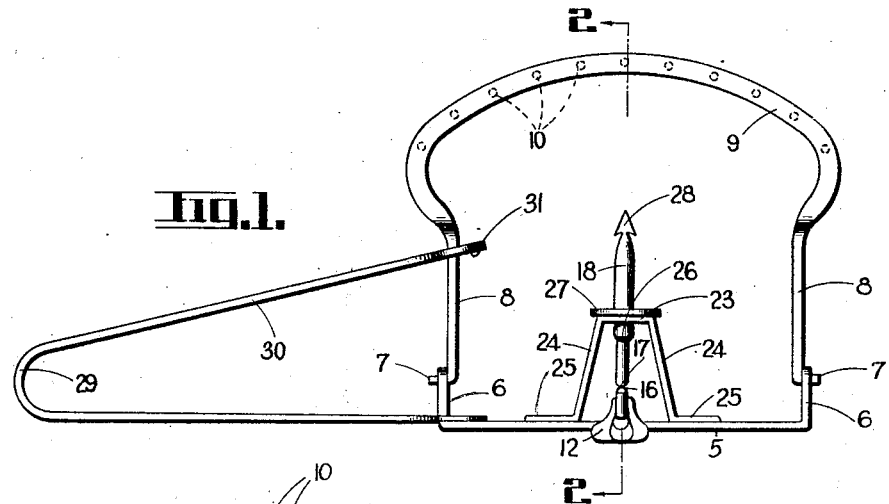
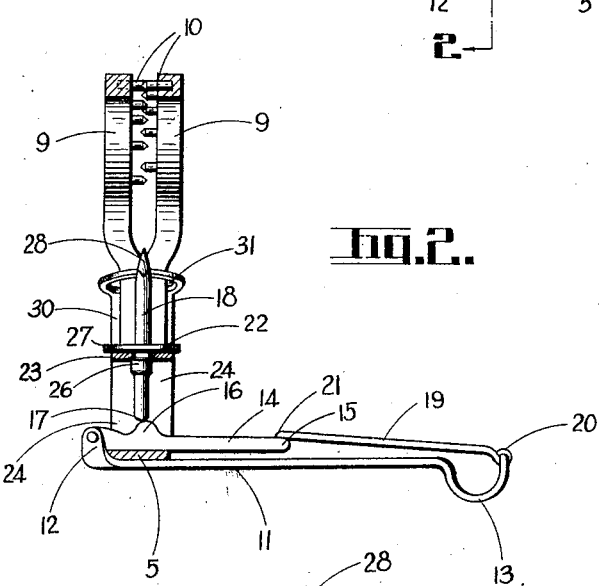
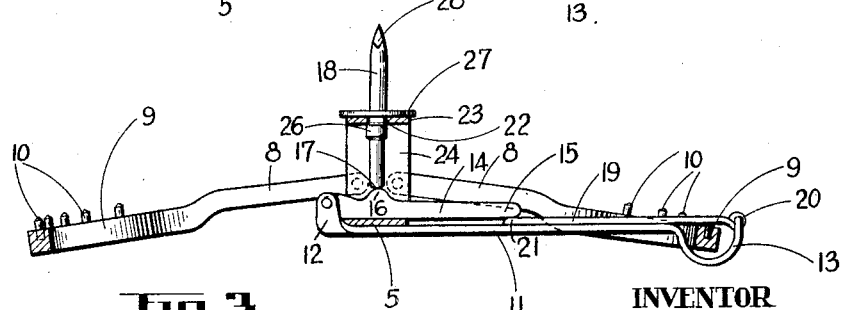
INVENTOR
Jean Baptiste Gagne
By Harold C. Shipman
ATTORNEY

Patented July 14, 1925.

1,546,066

UNITED STATES PATENT OFFICE.

JEAN BAPTISTE GAGNE, OF WALFORD STATION, ONTARIO, CANADA.

TRAP.

Application filed June 16, 1924. Serial No. 720,346.

*To all whom it may concern:*

Be it known that I, JEAN BAPTISTE GAGNE, a citizen of the Dominion of Canada, and resident of Walford Station, in the district of Algoma and Province of Ontario, Dominion of Canada, have invented certain new and useful Improvements in a Trap, of which the following is a specification.

This invention has relation to certain new and useful improvements in a trap and has for its primary object the provision of a simple form of trap including spring actuated jaws normally held in set position by a latch which is adapted to be released by movement of the bait holder.

The invention has for another object the provision of a trap of the character stated in which the parts are of simple construction and arrangement as well as positive in operation and the complete trap of inexpensive construction.

A further object of the invention resides in the provision of a trap of the character stated in which the bait holder is balanced on the latch when the trap is set so that the trap latch will be released upon a slight movement of the bait holder to throw the latter off of the latch and thereby permit action of the spring in quickly closing the jaws upon one another to trap any animal attempting to remove the bait from the bait holder.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application and in which:

Fig. 1 is an elevation of the trap in operated position.

Fig. 2 is a vertical section, substantially on the plane of line 2—2 of Fig. 1, looking in the direction indicated by the arrows.

Fig. 3 is a vertical section corresponding to Fig. 2 and showing the trap in set position.

Referring more in detail to the drawings in which similar reference characters designate corresponding parts throughout the several views, it is to be noted that the base plate 5 has upturned flanges 6 at its opposite ends, in which are pivoted the outturned extremities 7 of the straight end portions 8 of the arcuate jaws 9. The arcuate jaws 9 carry suitably spaced teeth 10 with the teeth of each jaw 9 offset from the teeth of the other jaw 9, so as to properly cooperate therewith, as will be evident by referring to Fig. 2 of the drawings. Extended transversely beneath the base plate 5 is the latch supporting plate 11 which has one end extended up to form the bifurcated bracket 12 adjacent one side or edge of the base plate 5. The latch supporting plate 11 is extended for a suitable distance in the opposite direction and terminates in a downwardly looped or offset outer end 13 adapted to receive one of the jaws 9 when the trap is in set position, as shown clearly in Fig. 3. A comparatively short latch bar 14 is pivoted by one end in the bracket 12, while its other or free end 15 is rounded or bevelled, as shown clearly in Fig. 2. The latch bar 14 also has a rounded or bevelled enlargement 16 formed on its upper face, near its pivoted end, to form a rest for the rounded lower end 17 of the vertical bait carrying member 18, when the trap is in set position, as shown in Fig. 3, and as will be later more clearly understood. The second or comparatively long latch bar 19 has its outer end 20 pivoted in the end 13 of the latch supporting plate 11, while the other or free end 21 of the latch bar 14 is bevelled or rounded and adapted for engagement beneath the free rounded end 15 of the latch bar 14 when the trap is set, with the latch bar 19 extended across the open jaw resting in the end 13 of the latch supporting plate 11, so as to prevent closing of the jaws until the latch is released by movement of the bait carrying member 18 off of the enlargement 16 of the latch bar 14.

The bait carrying member 18 is in the form of an upstanding pin which is loosely engaged through the opening 22 in the main or central portion of the supporting bracket 23. The sides 24 of the supporting bracket 23 diverge downwardly and terminate in outturned ends 25 secured on the upper face of the base plate 5, as shown in the drawings. The bait carrying member 18 has an annular or circumferential enlargement 26 to limit upward movement of the member 18 in the bracket 23 while downward movement of the member 18 in the bracket 23 is limited by the washer 27 secured on the member 18 above the bracket 23. The member 18 is shown as being tapered toward its upper end and terminating in an arrow head 28 on which the bait may be securely positioned.

When the bait carrying member 18 is moved off of the enlargement 16 of the latch member 14 after setting of the trap, the jaws 9 will be immediately closed with considerable force and speed by the trap operating spring 29. It will be seen clearly from Fig. 1 of the drawings that the spring 29 is of substantially V-shaped form and has the ends of its diverging legs 30 enlarged and provided with openings through which the flange 6 and the straight end portions 8 of the jaws 9 at one side of the trap extend. The opening 31 in the end of the upper leg 30 of the spring 29 is also large enough to prevent interference with free operation of the spring 29 by the outturned extremities 7 of the jaws 9 at this side of the trap.

It is believed the complete construction and operation of the trap may now be understood from the foregoing paragraphs taken in connection with the accompanying drawings, without further detailed description. It may be briefly stated, however, that when the trap is to be set, the latch member 19 is swung outwardly and the spring 29 is compressed by pressing downwardly the upper leg 30 thereof to permit the jaws 9 to be separated and swung downwardly and outwardly to the position shown in Fig. 3. The latch member 19 is then swung back into operative position and engaged beneath the latch bar 14. While the jaws 9 are still held in this position, the bait carrying member 18 is set and properly balanced on the enlargement 16 of the latch bar, it being understood that the bait has been previously firmly attached to the arrow head 25 of the member 18. When all of the parts are properly set, as stated, the end of the upper leg 30 of the spring 29 is held down below the extremities 7 of the jaws 9. The trap, when set, may be positioned in water or snow or any other place desired and may be completely concealed, with the exception of the bait. Any attempt to remove the bait from the member 18 will result in throwing the rounded lower end 17 thereof off of the enlargement 16 of the latch bar 14 and thereby releasing the entire trap. The spring 29 will immediately expand and the upper arm 30 thereof will ride upwardly on the jaws 9 to close the latter with considerable speed and force, thereby causing the teeth 10 carried by the jaws 5 to grip and hold the head or paw of the animal attempting to remove the bait from the member 18. It is evident that the operation of the trap will be instantaneous and effective. It is also apparent that the trap may be readily set and baited for various animals.

While the preferred embodiment of the invention has been disclosed, it is to be understood that minor changes in the details of construction, combination and arrangement of co-operating elements may be resorted to within the scope of what is claimed, without departing from the spirit of the invention.

What I claim as new is:

1. A trap including a base plate; a latch supporting plate extended at right angles from said base plate; latch members pivoted to the opposite ends of said latch supporting plate and arranged for overlapping engagement at their free ends when the trap is set; said latch supporting plate having a depressed portion; jaws pivoted to said base plate and adapted to be swung downwardly and outwardly for setting the trap with one of said jaws engaged in the depressed portion of the latch supporting plate and beneath one of the latch members; a spring engaged with said jaws and adapted to close the latter when the trap is operated; and a bait carrying member supported above one of the latch members and adapted to be balanced thereon when the trap is set so as to cause releasing of the latch and operation of the spring to operate the trap when the bait holding member is moved off of the last mentioned latch member by an attempt at removing the bait.

2. A trap including a base plate having upturned ends; a latch supporting plate secured to said base plate and extended from one side thereof at a right angle to said base plate; said latch supporting plate having a depressed outer end; latch bars pivoted to the opposite ends of said latch supporting plate and adapted to have their free inner ends engaged in overlapping position when the trap is set; one of said latch bars having an enlargement on its upper face; a supporting bracket mounted on said base plate; a bait carrying member loosely mounted in said supporting bracket and limited in its movement therein; said bait carrying member having a rounded lower end adapted to be balanced on said enlargement of the latch plate beneath the same to retain the trap in set position; jaws pivotally mounted in the upturned ends of said base plate and having arcuate portions with opposed and offset teeth projecting therefrom for co-operation when the trap is operated; and a spring engaged on one side of said trap and adapted to operate on one end of the jaws to quickly close the same with force when the bait carrying member is swung off of the enlargement of the latch member beneath the same by an attempt at removing the bait from the bait carrying member.

In testimony whereof, I affix my signature.

JEAN BAPTISTE GAGNE.